(12) United States Patent
Fukuzono et al.

(10) Patent No.: US 12,506,652 B2
(45) Date of Patent: Dec. 23, 2025

(54) WIRELESS COMMUNICATION SYSTEM, WIRELESS COMMUNICATION METHOD, AND WIRELESS COMMUNICATION TRANSMISSION DEVICE

(71) Applicant: NTT, Inc., Tokyo (JP)

(72) Inventors: Hayato Fukuzono, Musashino (JP); Toshifumi Miyagi, Musashino (JP); Keita Kuriyama, Musashino (JP); Masafumi Yoshioka, Musashino (JP)

(73) Assignee: NTT, Inc., Tokyo (JP)

( * ) Notice: Subject to any disclaimer, the term of this patent is extended or adjusted under 35 U.S.C. 154(b) by 43 days.

(21) Appl. No.: 18/294,161

(22) PCT Filed: Sep. 3, 2021

(86) PCT No.: PCT/JP2021/032459
§ 371 (c)(1),
(2) Date: Feb. 1, 2024

(87) PCT Pub. No.: WO2023/032159
PCT Pub. Date: Mar. 9, 2023

(65) Prior Publication Data
US 2024/0348488 A1    Oct. 17, 2024

(51) Int. Cl.
*H04L 27/36* (2006.01)
*H04L 27/38* (2006.01)

(52) U.S. Cl.
CPC .............. *H04L 27/36* (2013.01); *H04L 27/38* (2013.01)

(58) Field of Classification Search
CPC ......... H04L 27/36; H04L 27/38; H04L 27/34; H04L 27/3405
See application file for complete search history.

(56) References Cited

U.S. PATENT DOCUMENTS

2007/0253507 A1* 11/2007 Zhou ................. H04L 1/0656
375/267
2014/0314005 A1* 10/2014 Sagong ................. H04L 5/005
370/329

(Continued)

FOREIGN PATENT DOCUMENTS

| EP | 3010191 A1 | 4/2016 |
| JP | 2015-002354 A | 1/2015 |
| WO | WO-2006096680 A1 * | 9/2006 ........... H04B 14/026 |

OTHER PUBLICATIONS

Ibnkahla et al., "High-Speed Satellite Mobile Communications: Technologies and Challenges", Proceedings of the IEEE, vol. 92, No. 2, Feb. 2004, pp. 312-339.

(Continued)

*Primary Examiner* — Jean B Corrielus
(74) *Attorney, Agent, or Firm* — XSENSUS LLP

(57) ABSTRACT

The present disclosure relates to a wireless communication system using a quadrature amplitude modulation scheme. A transmission device includes: a transmission signal amplifier enabled to vary transmission power; a transmission power control unit that controls the transmission power; and an approximate pattern information notification unit that generates pattern information on an approximate constellation. In a case where 64 QAM is used as the modulation scheme, a 64 QAM distortion constellation is generated in the non-linear region of the transmission signal amplifier. In this case, a 64 APSK approximate constellation is generated, and pattern information on the 64 APSK approximate constellation is transmitted to a reception device. The reception device performs likelihood calculation for a reception point indicated by a data signal by using the approximate constellation corresponding to the pattern information.

15 Claims, 9 Drawing Sheets

(56) References Cited

U.S. PATENT DOCUMENTS

2018/0076993 A1* 3/2018 Seo ................ H04L 27/2604
2020/0052820 A1* 2/2020 Chen .................. H04J 99/00

OTHER PUBLICATIONS

Zhang et al., "Data-Aided Distorted Constellation Estimation and Demodulation for 60GHz mmWave WLAN", 2012 IEEE Wireless Communications and Networking Conference, 2012, pp. 1158-1162.

* cited by examiner

TRANSMISSION POWER $P_1$  ⇨ .... ⇨ TRANSMISSION POWER $P_N$

WIRELESS COMMUNICATION SYSTEM, WIRELESS COMMUNICATION METHOD, AND WIRELESS COMMUNICATION TRANSMISSION DEVICE

CROSS-REFERENCE TO RELATED APPLICATION

The present application is a 371 of international application [based on PCT filing] PCT/JP2021/032459, filed Sep. 3, 2021, the entire contents of which is incorporated herein by reference.

TECHNICAL FIELD

The present disclosure relates to a wireless communication system, a wireless communication method, and a wireless communication transmission device, and more particularly, to a wireless communication system, a wireless communication method, and a wireless communication transmission device using a quadrature amplitude modulation scheme.

BACKGROUND ART

Non Patent Literature 1 below discloses a technique related to a wireless communication system using a quadrature amplitude modulation (QAM) scheme. In wireless communication, a signal to noise ratio (SNR) can be increased as transmission power is increased.

On the other hand, an amplifier of a transmission signal exhibits a linear input-output characteristic in a region where input power is small, but generally exhibits a non-linear characteristic in a region where the power is large. For this reason, in the wireless communication, as the transmission power increases, distortion is more likely to occur in the transmission signal.

In the wireless communication system using the QAM scheme, transmission signals emitted from a transmission device form a constellation regularly arranged in a lattice pattern if there is no distortion. Then, a reception device assumes that a reception signal forms such a regular constellation, and identifies the signal.

Under such a premise, if distortion occurs in the transmission signal, correspondence between an actually transmitted signal and the constellation assumed by the reception device collapses. As a result, a situation may occur in which data cannot be correctly identified in the reception device.

To avoid an influence of such distortion, Non Patent Literature 1 discloses a technique for keeping transmission power within a linear region of an amplifier. If the transmission signal falls within the linear region of the amplifier, no distortion is superimposed on the transmission signal. For this reason, according to the technique described in Non Patent Literature 1, it is possible to cause the reception device to always process a signal correctly, and it is possible to effectively prevent erroneous recognition of data.

CITATION LIST

Non Patent Literature

Non Patent Literature 1: High-Speed Satellite Mobile Communications: Technologies and Challenges, MOHAMED IBNKAHLA, QUAZI MEHBUBAR RAHMAN, AHMED IYANDA SULYMAN, HISHAM ABDULHUSSEIN AL-ASADY, JUN YUAN, AND AHMED SAFWAT, p 312-339, PROCEEDINGS OF THE IEEE, VOL. 92, NO. 2, February 2004

SUMMARY OF INVENTION

Technical Problem

However, the technique of Non Patent Literature 1 solves the problem of distortion by giving up use of a non-linear region of the amplifier. That is, in this technique, the amplifier cannot sufficiently exhibit its original capability, and there occurs a situation against an essential requirement of using large power without excessive capital investment.

The present disclosure has been made in view of the above problem, and a first object thereof is to provide a wireless communication system capable of effectively preventing erroneous recognition of data while utilizing a non-linear region of an amplifier in wireless communication using the QAM scheme.

In addition, a second object of the present disclosure is to provide a wireless communication method for effectively preventing erroneous recognition of data while utilizing a non-linear region of an amplifier in wireless communication using the QAM scheme.

In addition, a third object of the present disclosure is to provide a wireless communication transmission device capable of effectively preventing erroneous recognition of data while utilizing a non-linear region of an amplifier in wireless communication using the QAM scheme.

Solution to Problem

To achieve the above objects, a first aspect is desirably a wireless communication system including a transmission device and a reception device that perform wireless communication by using a quadrature amplitude modulation scheme, in which
the transmission device includes:
a transmission signal amplifier enabled to vary transmission power;
a transmission power control unit that controls transmission power used by the transmission signal amplifier;
an approximate pattern information notification unit that generates, on the basis of the transmission power, pattern information on an approximate constellation obtained by approximately arranging each of signal points included in a normal constellation of the quadrature amplitude modulation scheme on any of a predetermined number of concentric circles; and
an information bit generation unit that generates information bits such that the pattern information is transmitted prior to a data signal, and
the reception device includes a likelihood calculation unit that performs likelihood calculation for a reception point indicated by the data signal by using the approximate constellation corresponding to the pattern information.

In addition, a second aspect is desirably a wireless communication method using a transmission device and a reception device that perform wireless communication by using a quadrature amplitude modulation scheme,
the transmission device including a transmission signal amplifier enabled to vary transmission power,
the wireless communication method including:
a step of controlling transmission power used by the transmission signal amplifier;

an approximate pattern information notification step of generating, on the basis of the transmission power, pattern information on an approximate constellation obtained by approximately arranging each of signal points included in a normal constellation of the quadrature amplitude modulation scheme on any of a predetermined number of concentric circles;

a step of transmitting the pattern information toward the reception device prior to a data signal; and a likelihood calculation step, by the reception device, of performing likelihood calculation for a reception point indicated by the data signal by using the approximate constellation corresponding to the pattern information.

In addition, a third aspect is desirably a wireless communication transmission device that performs wireless communication with a reception device by using a quadrature amplitude modulation scheme, the wireless communication transmission device including:

a transmission signal amplifier enabled to vary transmission power;

a transmission power control unit that controls transmission power used by the transmission signal amplifier;

an approximate pattern information notification unit that generates, on the basis of the transmission power, pattern information on an approximate constellation obtained by approximately arranging each of signal points included in a normal constellation of the quadrature amplitude modulation scheme on any of a predetermined number of concentric circles; and an information bit generation unit that generates information bits such that the pattern information is transmitted prior to a data signal.

Advantageous Effects of Invention

According to the first to third aspects, it is possible to effectively prevent data from being erroneously recognized in the reception device while utilizing the non-linear region of the amplifier included in the transmission device.

DESCRIPTION OF EMBODIMENTS

First Embodiment

Overall Configuration of First Embodiment

Figure 1:
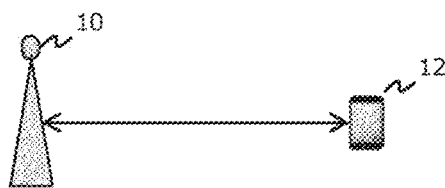
FIG. 1 is a diagram for explaining an overall configuration of a wireless communication system of a first embodiment of the present disclosure.

FIG. 1 illustrates an overall configuration of a wireless communication system of a first embodiment of the present disclosure. As illustrated in FIG. 1, the wireless communication system of the present embodiment includes a transmission device 10 and a reception device 12. The transmission device 10 includes, for example, a base station for mobile communication operated by a communication company, an access point of WiFi (registered trademark), or the like. In addition, the reception device 12 includes a terminal station such as a smartphone or a tablet terminal.

Problem Focused on by First Embodiment

Figure 2:
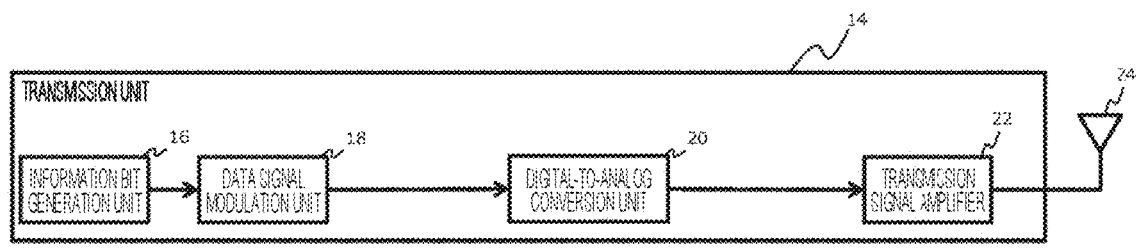
FIG. 2 is a diagram for explaining a configuration of a transmission device to be compared with a transmission device in the first embodiment of the present disclosure.

FIG. 2 is a block diagram for explaining a configuration of a transmission device 14 to be compared with the transmission device 10 in the present embodiment. The transmission device 14 of a comparative example includes an information bit generation unit 16. The information bit generation unit 16 generates information bits to be transmitted to the reception device 12. The information bit generation unit 16 may have an error correction coding function or an interleaving function.

The information bits generated by the information bit generation unit 16 are provided to a data signal modulation unit 18. The data signal modulation unit 18 modulates the provided information bits into a data signal. As a modulation scheme, quadrature amplitude modulation (QAM) is used.

The data signal generated by the data signal modulation unit 18 is provided to a digital-to-analog conversion unit 20. The digital-to-analog conversion unit 20 converts the digitally-modulated data signal into an analog transmission signal.

The transmission signal generated by the digital-to-analog conversion unit 20 is provided to a transmission signal amplifier 22. The transmission signal amplifier 22 amplifies the transmission signal and provides the amplified signal to an antenna 24. Then, the transmission signal is transmitted from the antenna 24 toward the reception device 12 in a form of a wireless signal.

Figure 3:
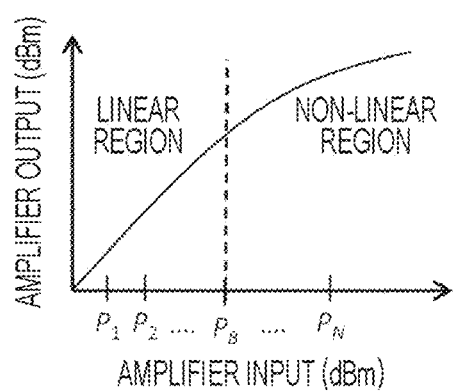
FIG. 3 is a diagram illustrating an input-output characteristic of an amplifier built in the transmission device.

FIG. 3 illustrates an input-output characteristic of the transmission signal amplifier 22. As illustrated in FIG. 3, in a region where input power (horizontal axis) is smaller than $P_B$, output power (vertical axis) of the transmission signal amplifier 22 is proportional to the input power. Then, in a region where the input power exceeds $P_B$, a proportional relationship between them collapses. Hereinafter, a region where they have the proportional relationship is referred to as a "linear region", and a region where the proportional relationship between them collapses is referred to as a "non-linear region".

Figure 4:
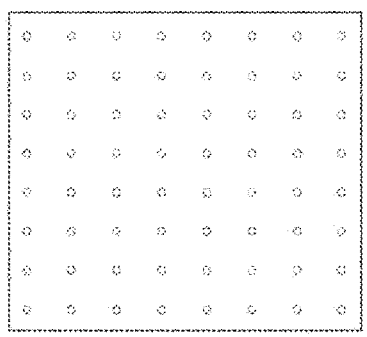
FIG. 4 is a diagram illustrating a state in which distortion occurs in a constellation with an increase in transmission power.
Figure 4:
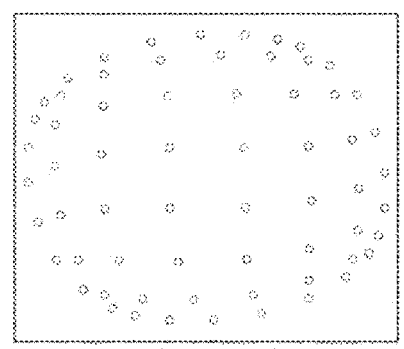

FIG. 4 illustrates a state in which distortion occurs in a constellation of 8×8=64 QAM with an increase in transmission power. In the modulation scheme of 64 QAM, 64 symbols arranged in a lattice pattern are defined by changing and adjusting amplitudes of two carrier waves independent of each other. Hereinafter, a point on constellation coordinates at which each of the 64 symbols is defined is referred to as a "signal point". In addition, a point on the constellation coordinates of each data signal to be actually transmitted is referred to as a "reception point".

In the linear region of the transmission signal amplifier 22, as illustrated on the left side (transmission power $P_1$) of FIG. 4, reception points form a constellation without distortion. On the other hand, in the non-linear region of the transmission signal amplifier 22, as illustrated on the right side (transmission power $P_N$) of FIG. 4, distortion is superimposed on the constellation of the reception points. Hereinafter, the constellation without distortion is referred to as "normal constellation". In addition, the constellation with distortion is referred to as a "distortion constellation".

The reception device 12 performs likelihood calculation with signal points existing in the vicinity for each of the reception points included in the transmission signal, and recognizes each of the reception points as any of the 64 symbols on the basis of a result of calculation. Note that the calculation of a likelihood can be executed by, for example, a method described in the following literature.

On the Optimality of Bit Detection of Certain Digital Modulations, Marvin K. Simon and Ramesh Annavajjala, p 299-307, IEEE TRANSACTIONS ON COMMUNICATIONS, VOL. 53, NO. 2, February 2005

In a case where the reception device 12 performs the likelihood calculation by using signal points of the normal constellation, a reception point generated in the linear region is correctly recognized. However, a reception point generated in the non-linear region deviates from a normal position. For this reason, the reception device 12 that calculates the likelihood by using the normal constellation cannot correctly calculate the likelihood for the reception point generated in the non-linear region. As a result, erroneous recognition of data may occur in the reception device 12.

In the transmission device 14 of the comparative example, if the transmission power is limited to the linear region of the transmission signal amplifier 22, it is possible to prevent distortion from being superimposed on the reception point. Thus, by applying such a limitation, it is possible to prevent erroneous recognition of data in the reception device 12. However, in that case, an amplification capability of the transmission signal amplifier 22 cannot be sufficiently utilized.

The input-output characteristic as illustrated in FIG. 3 can be grasped in advance in the transmission device 14. Then, if the input-output characteristic are grasped in advance, the distortion superimposed on the constellation can be estimated as a function of the transmission power. For this reason, in the transmission device 14, at a stage where transmission power used for communication is determined, it is possible to estimate a distortion constellation corresponding to the transmission power.

In a case where the non-linear region of the transmission signal amplifier 22 is used, if the transmission device 14 provides information on the estimated distortion constellation to the reception device 12, the reception device 12 can perform correct likelihood calculation for the reception point by using the distortion constellation. In addition, according to such processing, it is also possible to sufficiently utilize the amplification capability of the transmission signal amplifier 22.

However, provision of the information on the distortion constellation is accompanied by a large amount of communication. For example, in the case of 64 QAM, it is necessary to transmit an amplitude and a phase at 64 signal points. In addition, since an amount of distortion of the constellation changes depending on the transmission power, it is necessary to perform the provision of the information every time the transmission power changes. For this reason, in a case where the information on the distortion constellation is provided to the reception device 12 to attempt to utilize the non-linear region, a situation occurs in which a data rate in communication greatly decreases.

To suppress such a decrease in the data rate, the wireless communication system of the present embodiment replaces the distortion constellation with an approximate constellation having a smaller amount of information and provides information on the approximate constellation to the reception device 12. Hereinafter, a detailed description will be given of method in which the system of the present embodiment uses the approximate constellation.

Features of First Embodiment

Figure 5:
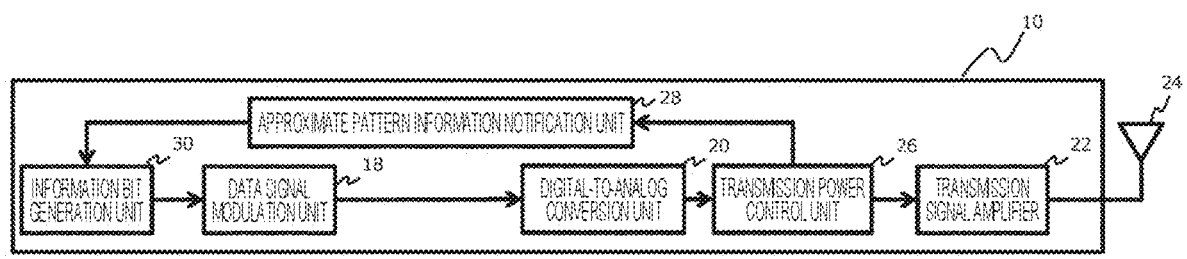
FIG. 5 is a block diagram for explaining a configuration of the transmission device in the first embodiment of the present disclosure.

FIG. 5 is a block diagram of the transmission device 10 of the present embodiment. Note that, in FIG. 5, the same elements as those included in the transmission device 14 of the comparative example (see FIG. 2) are denoted by the same reference signs, and description thereof will be omitted or simplified.

The transmission device 10 includes a transmission power control unit 26 at a preceding stage of the transmission signal amplifier 22. The transmission power control unit 26 controls the transmission power used by the transmission signal amplifier 22 to obtain desired communication quality. A control command of the transmission power control unit 26 is provided to the transmission signal amplifier 22 and is provided to an approximate pattern information notification unit 28.

In a case where the transmission power belongs to the linear region of the transmission signal amplifier 22, the approximate pattern information notification unit 28 provides that effect to an information bit generation unit 30. In addition, in a case where the transmission power belongs to the non-linear region of the transmission signal amplifier 22, pattern information is generated indicating an approximate constellation of a distortion constellation corresponding to the transmission power. The pattern information is provided to the information bit generation unit 30.

The information bit generation unit 30 has, in addition to the same function as the information bit generation unit 16 included in the transmission device 14 of the comparative example, a function of converting information provided from the approximate pattern information notification unit 28 into bits. That is, the information bit generation unit 30 has a function of converting information indicating that the transmission power belongs to the linear region and pattern information on the approximate constellation into bits Hereinafter, these pieces of information are referred to as "constellation information".

The constellation information is transmitted prior to the data signal. For this reason, before receiving the data signal, the reception device 12 can receive information on an approximate constellation corresponding to the transmission power of the data signal.

Figure 6:
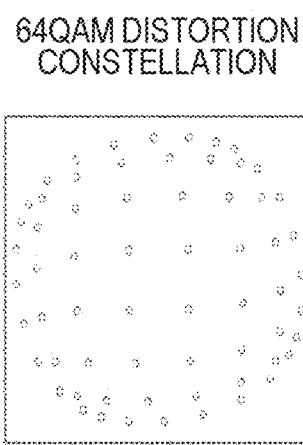
FIG. 6 is a diagram illustrating a distortion constellation and an approximate constellation in comparison.
Figure 6:
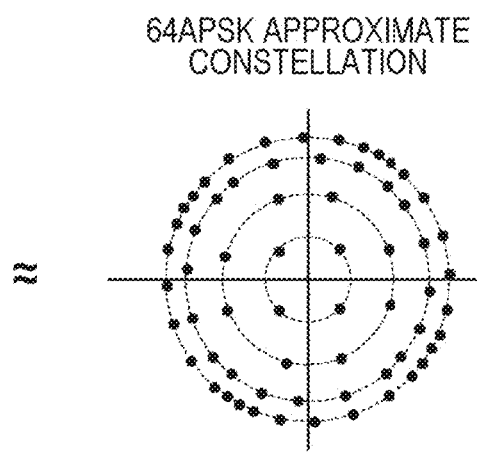

FIG. 6 illustrates a distortion constellation of 64 QAM and its approximate constellation in comparison. In the distortion constellation of 64 QAM, a tendency is indicated in which 64 signal points are denser as they are away from the center. Then, the signal points can be grouped as being on any of several concentric circles. More specifically, in a case where the modulation scheme is 64 QAM, a signal point of the distortion constellation can be approximated as being on any of four concentric circles similarly to a constellation of 64 amplitude phase shift keying (APSK).

The approximate constellation illustrated on the right side of FIG. 6 is obtained as a result of grouping the 64 signal points as being on any of four concentric circles. To transmit all the signal points included in the distortion constellation, it is necessary to define a radius and a phase or X and Y coordinates for all the 64 signal points. On the other hand, in the approximate constellation, information on the radius can be shared by a plurality of signal points on the same concentric circle. For this reason, an amount of information representing the approximate constellation is smaller than an amount of information representing the distortion constellation.

In the present embodiment, in a case where the transmission power belonging to the non-linear region is used, the approximate pattern information notification unit 28 first generates the distortion constellation as illustrated on the left side of FIG. 6 on the basis of the transmission power. Next, the signal points included in the distortion constellation are approximated as belonging to any of four concentric circles to generate an approximate constellation. Then, information on the approximate constellation is converted into bits by the information bit generation unit 30 and then transmitted toward the reception device 12.

Figure 7:
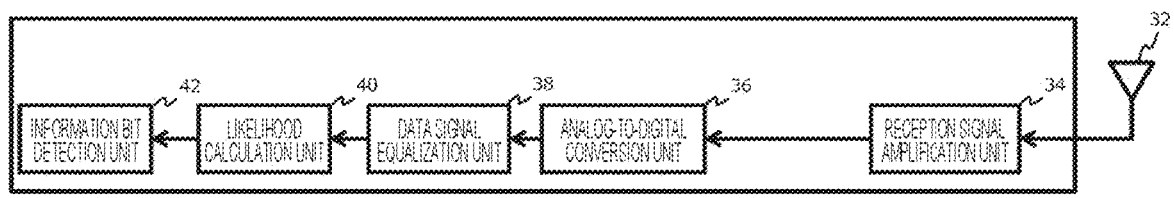
FIG. 7 is a block diagram for explaining a configuration of a reception device in the first embodiment of the present disclosure.

FIG. 7 is a block diagram for explaining a configuration of the reception device 12. The reception device 12 includes an antenna 32 for exchanging wireless signals with the transmission device 10. A signal received by the antenna 32 is provided to a reception signal amplification unit 34. The reception signal amplification unit 34 amplifies a received signal with an appropriate gain and provides the amplified signal to an analog-to-digital conversion unit 36.

The analog-to-digital conversion unit 36 is a block for demodulating a reception signal in an analog form into a digital signal. The signal digitized by the analog-to-digital conversion unit 36 is provided to a data signal equalization unit 38.

The data signal equalization unit 38 is a block that performs inverse calculation on information on an amplitude and a phase of a communication path response to obtain an estimated value of the reception signal. A training signal is exchanged between the transmission device 10 and the reception device 12 prior to the data signal. Content of the training signal is shared in advance between the transmission device 10 and the reception device 12. For this reason, the reception device 12 can detect an influence caused by a communication path on the basis of the actually received training signal. Specifically, the data signal equalization unit 38 generates a data signal in which the influence caused by the communication path is offset by reflecting a result of the training in the data signal received by the reception device 12. The data signal generated by the data signal equalization unit 38 is provided to a likelihood calculation unit 40.

The likelihood calculation unit 40 performs likelihood calculation for a reception point indicated by the data signal and some of signal points on the constellation to be compared. Then, a signal point at which the highest likelihood is obtained is recognized as a symbol intended by the reception point of this time. In a case where the transmission power belongs to the linear region, the likelihood calculation unit 40 uses the normal constellation as the constellation to be compared. In addition, in a case where the transmission power belongs to the non-linear region, the approximate constellation is used as the constellation to be compared. A signal symbolized by the likelihood calculation unit 40 is provided to an information bit detection unit 42.

The information bit detection unit 42 detects received bits from the symbolized signal. The information bit detection unit 42 may have an error correction decoding function or an interleaving function as necessary.

Characteristic Processing of Transmission Device

Figure 8:
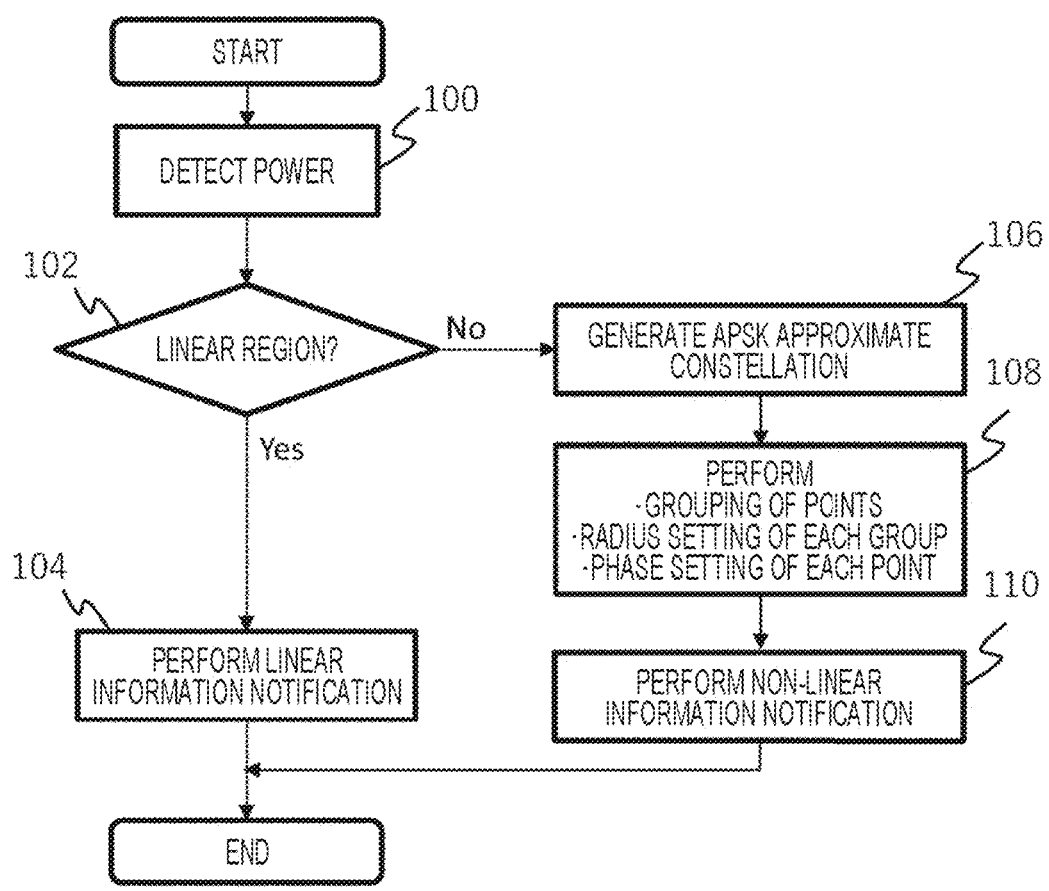
FIG. 8 is a flowchart for explaining a flow of processing executed by an approximate pattern information notification unit of the transmission device in the first embodiment of the present disclosure.

FIG. 8 is a flowchart for explaining a flow of processing executed by the approximate pattern information notification unit 28 of the transmission device 10. As illustrated in FIG. 8, in this routine, first, transmission power set in the transmission power control unit 26 is detected (step 100).

Next, it is determined whether or not the transmission power belongs to the linear region of the transmission signal amplifier 22 (step 102).

As a result, in a case where it is determined that the transmission power belongs to the linear region, it can be determined that no distortion is superimposed on the transmission signal. In this case, the information bit generation unit 30 is notified that the transmission signal belongs to the linear region as constellation information under the linear region (step 104). Thereafter, this information is transmitted toward the reception device 12 prior to the data signal.

On the other hand, in a case where it is determined in step 102 that the transmission power does not belong to the linear region, an approximate constellation is generated that simulates a constellation of APSK (step 106). Specifically, first, a distortion constellation corresponding to the transmission power is generated on the basis of the specification of the transmission signal amplifier 22. Next, signal points included in the distortion constellation are approximated as being on any of a predetermined number of concentric circles.

Next, signal points included in the approximate constellation are grouped into signal points on the same concentric circle. Next, as information common to signal points belonging to each group, a radius of the concentric circle of each group is set. Further, a phase is set as information on each signal point (step 108).

When the above processing ends, group information on the signal points, radius information on each group, and phase information on each signal point are provided to the information bit generation unit 30 as constellation information under the non-linear region (step 110). Thereafter, this information is transmitted toward the reception device 12 prior to the data signal.

Characteristic Processing of Reception Device

Figure 9:
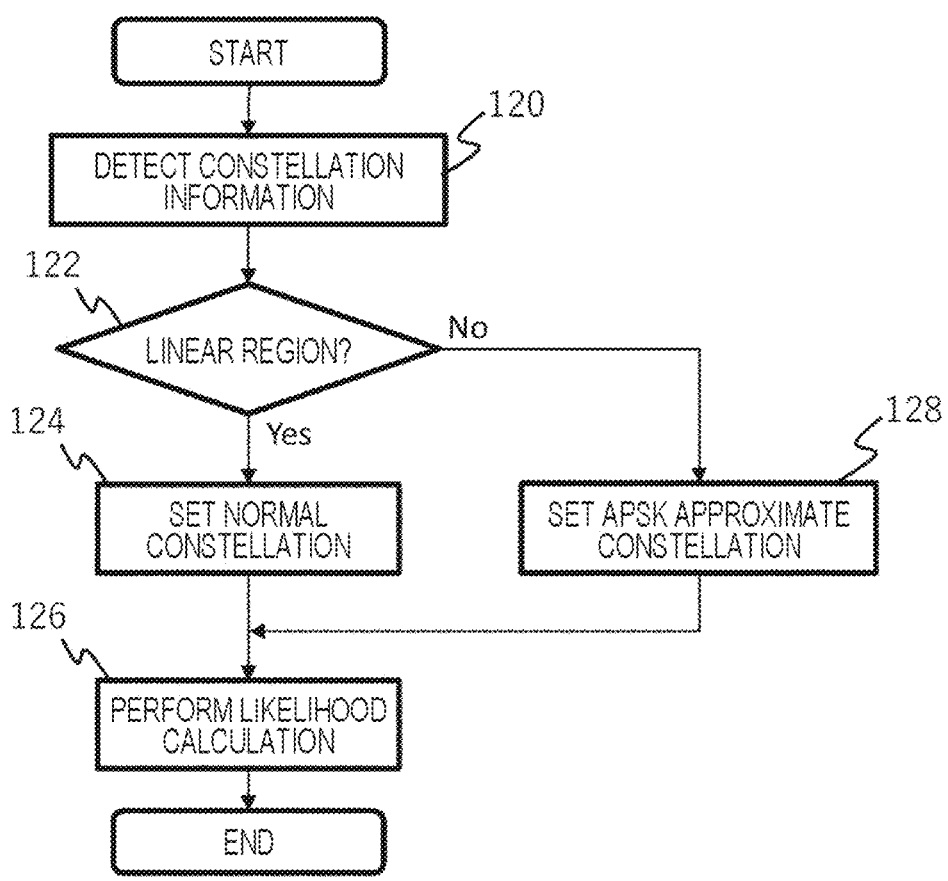
FIG. 9 is a flowchart for explaining a flow of processing executed by a likelihood calculation unit of the reception device in the first embodiment of the present disclosure.

FIG. 9 is a flowchart for explaining a flow of processing executed by the likelihood calculation unit 40 of the reception device 12. As illustrated in FIG. 9, in this routine, first, constellation information is detected from a reception signal (step 120).

Next, it is determined whether or not the detected constellation information is information under the linear region (step 122).

As a result, in a case where it is determined that the constellation information is information under the linear region, it can be determined that no distortion is superimposed on the reception signal. In this case, in likelihood calculation, a normal constellation is set as a constellation to be compared with a reception point (step 124).

Thereafter, likelihood calculation regarding the reception point is performed by using the set constellation (step 126). Under a state where no distortion is superimposed on the reception point, a likelihood can be correctly calculated by using the normal constellation. For this reason, the reception device 12 can correctly symbolize the reception point.

In a case where constellation information under the non-linear region is received, the determination in step 122 is denied. In this case, an approximate constellation is generated on the basis of the received constellation information. Then, the approximate constellation is set as a constellation used for likelihood calculation (step 128).

In this case, in step 126, likelihood calculation based on the approximate constellation is performed instead of the normal constellation. The distortion superimposed on the reception point is reflected in the approximate constellation. For this reason, even if the distortion is superimposed on the reception point, the reception device 12 can execute correct likelihood calculation and can appropriately symbolize the reception point.

As described above, according to the present embodiment, in a case where the transmission power belongs to the linear region of the transmission signal amplifier 22, the reception device 12 is caused to execute likelihood calculation using the normal constellation. As a result, correct transmission of the data signal is achieved.

In addition, according to the present embodiment, in a case where the transmission power belongs to the non-linear region of the transmission signal amplifier 22, the information on the approximate constellation can be provided to the reception device 12. The influence of distortion superimposed on the reception point is reflected in the approximate constellation. For this reason, correct transmission of the data signal is achieved even though the distortion is superimposed on the reception point.

Further, an amount of information necessary for sharing the approximate constellation is smaller than an amount of information necessary for sharing the distortion constellation. For this reason, as compared with a case where the distortion constellation itself is provided to the reception device 12, an amount of information necessary to be provided to the reception device 12 can be suppressed. As a result, according to the present embodiment, it is possible to achieve appropriate data transmission while maintaining a high data rate while utilizing the amplification capability of the transmission signal amplifier 22 without waste.

Modification of First Embodiment

By the way, in the first embodiment, a case has been described where the modulation scheme is 64 QAM; however, the present disclosure is not limited thereto. That is, the modulation scheme applicable to the present disclosure is not limited to 64 QAM, and other modulation schemes such as 256 QAM can be applied.

REFERENCE SIGNS LIST

10 Transmission device
12 Reception device
22 Transmission signal amplifier
26 Transmission power control unit
28 Approximate pattern information notification unit
30 Information bit generation unit
40 Likelihood calculation unit

The invention claimed is:

1. A wireless communication system comprising a transmitter and a receiver that perform wireless communication by using a quadrature amplitude modulation scheme, wherein
the transmitter includes:
a transmission signal amplifier enabled to vary transmission power;
a transmission power controller that controls transmission power used by the transmission signal amplifier;
an approximate pattern information notification circuitry that generates, on a basis of the transmission power, pattern information on an approximate constellation obtained by approximately arranging each of signal points included in a normal constellation of the quadrature amplitude modulation scheme on any of a predetermined number of concentric circles; and
an information bit generation circuitry that generates information bits such that the pattern information is transmitted prior to a data signal, and
the receiver includes a likelihood calculation circuitry that performs likelihood calculation for a reception point indicated by the data signal by using the approximate constellation corresponding to the pattern information.

2. The wireless communication system according to claim 1, wherein
the approximate pattern information notification circuitry is configured to:
generate the pattern information on the approximate constellation in a case where the transmission power belongs to a non-linear region of the transmission signal amplifier; and
generate, in a case where the transmission power belongs to a linear region of the transmission signal amplifier, linear information representing the state of the transmission power,
and
the likelihood calculation circuitry is configured to execute the likelihood calculation by using the normal constellation in a case where the linear information is transmitted toward the receiver.

3. The wireless communication system according to claim 1, wherein
the pattern information on the approximate constellation includes:
information representing a radius of each of the concentric circles;
information representing in which of the concentric circles each of the signal points is arranged; and
information representing a phase of each of the signal points on the approximate constellation.

4. The wireless communication system according to claim 1, wherein the quadrature amplitude modulation scheme is n QAM in which n signal points are defined on a constellation, and a number of concentric circles included in the approximate constellation is equal to a number of concentric circles included in a constellation of n Amplitude Phase Shift Keying (APSK) corresponding to n signal points.

5. The wireless communication system according to claim 2, wherein
the pattern information on the approximate constellation includes:
information representing a radius of each of the concentric circles;
information representing in which of the concentric circles each of the signal points is arranged; and
information representing a phase of each of the signal points on the approximate constellation.

6. The wireless communication system according to claim 2, wherein the quadrature amplitude modulation scheme is n QAM in which n signal points are defined on a constellation, and a number of concentric circles included in the approximate constellation is equal to a number of concentric circles included in a constellation of n Amplitude Phase Shift Keying (APSK) corresponding to n signal points.

7. The wireless communication system according to claim 3, wherein the quadrature amplitude modulation scheme is n QAM in which n signal points are defined on a constellation, and a number of concentric circles included in the approximate constellation is equal to a number of concentric circles included in a constellation of n Amplitude Phase Shift Keying (APSK) corresponding to n signal points.

8. The wireless communication system according to claim 5, wherein the quadrature amplitude modulation scheme is n QAM in which n signal points are defined on a constellation, and a number of concentric circles included in the approximate constellation is equal to a number of concentric circles included in a constellation of n Amplitude Phase Shift Keying (APSK) corresponding to n signal points.

9. The wireless communication system according to claim 1, wherein
the approximate pattern information notification circuitry is configured to:
generate the pattern information on the approximate constellation in a case where the transmission power belongs to a non-linear region of the transmission signal amplifier.

10. The wireless communication system according to claim 1, wherein
the pattern information on the approximate constellation includes:
information representing a radius of each of the concentric circles.

11. The wireless communication system according to claim 1, wherein
the pattern information on the approximate constellation includes:
information representing a radius of each of the concentric circles; and
information representing in which of the concentric circles each of the signal points is arranged.

12. A wireless communication method using a transmitter and a receiver that perform wireless communication by using a quadrature amplitude modulation scheme,
the transmitter including a transmission signal amplifier enabled to vary transmission power,
the wireless communication method comprising:
controlling transmission power used by the transmission signal amplifier;
generating, on a basis of the transmission power, pattern information on an approximate constellation obtained by approximately arranging each of signal points included in a normal constellation of the quadrature amplitude modulation scheme on any of a predetermined number of concentric circles;
transmitting the pattern information toward the receiver prior to a data signal; and
causing the receiver to perform likelihood calculation for a reception point indicated by the data signal by using the approximate constellation corresponding to the pattern information.

13. The wireless communication method according to claim 12, wherein
the procedure of generating the pattern information includes:
generating the pattern information on the approximate constellation in a case where the transmission power belongs to a non-linear region of the transmission signal amplifier; and
generating, in a case where the transmission power belongs to a linear region of the transmission signal amplifier, linear information representing the state of the transmission power, and
the likelihood calculation further includes executing the likelihood calculation by using the normal constellation in a case where the linear information is transmitted toward the receiver.

14. A wireless communication transmitter that performs wireless communication with a receiver by using a quadrature amplitude modulation scheme,
the wireless communication transmitter comprising:
a transmission signal amplifier enabled to vary transmission power;
a transmission power controller that controls transmission power used by the transmission signal amplifier;
an approximate pattern information notification circuitry that generates, on a basis of the transmission power, pattern information on an approximate constellation obtained by approximately arranging each of signal points included in a normal constellation of the quadrature amplitude modulation scheme on any of a predetermined number of concentric circles; and
an information bit generation circuitry that generates information bits such that the pattern information is transmitted prior to a data signal.

15. The wireless communication transmitter according to claim 14, wherein
the approximate pattern information notification circuitry is configured to:
generate the pattern information on the approximate constellation in a case where the transmission power belongs to a non-linear region of the transmission signal amplifier; and
generate, in a case where the transmission power belongs to a linear region of the transmission signal amplifier, linear information representing the state of the transmission power.

* * * * *